United States Patent
Ito et al.

(10) Patent No.: US 10,176,615 B2
(45) Date of Patent: Jan. 8, 2019

(54) IMAGE PROCESSING DEVICE, IMAGE PROCESSING METHOD, AND IMAGE PROCESSING PROGRAM

(71) Applicant: TOPCON CORPORATION, Itabashi-ku (JP)

(72) Inventors: Tadayuki Ito, Itabashi-ku (JP); You Sasaki, Itabashi-ku (JP); Takahiro Komeichi, Itabashi-ku (JP); Naoki Morikawa, Itabashi-ku (JP)

(73) Assignee: TOPCON CORPORATION, Itabashi-ku (JP)

( * ) Notice: Subject to any disclaimer, the term of this patent is extended or adjusted under 35 U.S.C. 154(b) by 26 days.

(21) Appl. No.: 15/377,187

(22) Filed: Dec. 13, 2016

(65) Prior Publication Data
US 2018/0165852 A1 Jun. 14, 2018

(51) Int. Cl.
*G06T 11/60* (2006.01)
*G06T 7/00* (2017.01)

(52) U.S. Cl.
CPC .......... *G06T 11/60* (2013.01); *G06T 7/97* (2017.01); *G06T 2207/20221* (2013.01)

(58) Field of Classification Search
None
See application file for complete search history.

(56) References Cited

U.S. PATENT DOCUMENTS

| | | | |
|---|---|---|---|
| 9,756,242 B2 * | 9/2017 | Harada | H04N 5/23238 |
| 2009/0021576 A1 * | 1/2009 | Linder | G03B 37/00 348/36 |
| 2012/0092348 A1 * | 4/2012 | McCutchen | G06T 3/00 345/474 |
| 2012/0242781 A1 * | 9/2012 | Gautier | H04N 21/21805 348/36 |
| 2016/0012855 A1 * | 1/2016 | Krishnan | G11B 27/105 386/241 |
| 2016/0188992 A1 * | 6/2016 | Hiraga | G06K 9/4604 382/199 |

FOREIGN PATENT DOCUMENTS

JP 2014-155168 8/2014

* cited by examiner

*Primary Examiner* — Ryan M Gray
(74) *Attorney, Agent, or Firm* — Xsensus, LLP (57) ABSTRACT

Problems occurring due to a difference in point of view between cameras in compositing a panoramic image by using multiple images taken by the cameras are solved. An image processing device includes an image data receiving unit 101, a panoramic image generating unit 102, a designation receiving unit 103, and a single photographic image selecting unit 105. The image data receiving unit 101 receives data of a first still image and a second still image. The panoramic image generating unit 102 projects the first still image and the second still image on a projection sphere to generate a composited image. The designation receiving unit 103 receives designation of a specific position in the panoramic image. The single photographic image selecting unit 105 selects one of the first still image and the second still image, which contains the designated position received by the designation receiving unit 103.

6 Claims, 9 Drawing Sheets

Low magnification (Panoramic image display)

Fig. 10B

Medium magnification (Panoramic image display)

Fig. 10C

High magnification (Single photographic image display)

IMAGE PROCESSING DEVICE, IMAGE PROCESSING METHOD, AND IMAGE PROCESSING PROGRAM

BACKGROUND OF THE INVENTION

Technical Field

The present invention relates to a technique for processing panoramic images.

Background Art

Multiple still images that are taken in different directions of view may be composited or stitched together to obtain a wide-angle image, which is a so-called "panoramic image". Such techniques are publicly known, and an example is disclosed in Japanese Unexamined Patent Application Laid-Open No. 2014-155168.

A panoramic image can be generated such that a projection sphere having a center at a specific point of view is set, and then multiple images are projected on the inner circumferential surface of the projection sphere. At that time, the multiple images are composited so that adjacent images partially overlap, whereby the panoramic image is obtained. If the multiple images for compositing the panoramic image have the same point of view, there is no discontinuity between adjacent images, and no distortion is generated in the panoramic image, in theory. However, multiple images to be composited can have points of view that are different from each other. For example, a panoramic camera may be equipped with multiple cameras, of which the positions of the points of view cannot be physically made to coincide with each other. Consequently, a panoramic image may contain discontinuities at stitched portions of adjacent images and be distorted overall.

SUMMARY OF THE INVENTION

In view of these circumstances, an object of the present invention is to solve problems occurring due to difference in point of view between cameras in compositing a panoramic image by using multiple images taken by the cameras.

A first aspect of the present invention provides an image processing device including an image data receiving unit, a composited image generating unit, a designation receiving unit, and a selecting unit. The image data receiving unit is configured to receive data of a first still image and a second still image, which are taken from different points of view and contain the same object. The composited image generating unit is configured to project the first still image and the second still image on a projection sphere and thereby generate a composited image. The designation receiving unit is configured to receive designation of a specific position in the composited image. The selecting unit is configured to select one oldie first still image and the second still image, which contains the designated specific position.

According to the first aspect of the present invention, when a specific portion is designated in a displayed composited image (displayed panoramic image), a single photographic image containing the designated specific portion is selected from multiple still images compositing the panoramic image. The single photographic image has no studied portions, unlike in a panoramic image, and thus, no deviations exist, unlike in a panoramic image. Although two still images are used in the first aspect of the present invention, the two images may be selected frail multiple still images and be used in the first aspect of the present invention. Accordingly, three or more still images may be processed in total.

According to a second aspect of the present invention, in the invention according to the first aspect of the present invention, the selecting unit may select one of the first still image and the second still image, of which the direction is similar to a direction of the specific position as viewed from a center of the projection sphere more than the other image. According to the second aspect of the present invention, the still image that is made of a single photographic image and that contains the designated specific position closest to its center is selected. The direction of the image is defined as a direction perpendicular to a plane of the still image. Alternatively, the direction of the image can also be defined as an extension direction of a line connecting the point of view of the still image and the center of the same, still image.

According to a third aspect of the present invention, in the invention according to the first or the second aspect of the present invention, the image processing device may further include a display controlling unit that is configured to control displaying of the first still image or the second still image on a display. The first still image and the second still image may have overlap portions. When one of the first still image and the second still image is displayed, and a specific position in the overlap portion is designated in the displayed still image, which is closer to a center of the other still image than a center of the displayed still image, the display controlling unit displays the other still image.

According to the third aspect of the present invention, the still image made of a single photographic image is switched in accordance with a change in a line of sight. At that time, the still image that contains a target point closest to its center is selected.

A fourth aspect of the present invention provides an image processing method including receiving data of a first still image and a second still image, which are taken from different points of view and contain the same object, and generating a composited image by projecting the first still image and the second still image on a projection sphere. The image processing method further includes receiving designation of a specific position in the composited image and selecting one of the first still image and the second still image, which contains the designated specific position.

A fifth aspect of the present invention provides a computer program product including a non-transitory computer-readable medium storing computer-executable program codes for processing images. The computer-executable program codes include program code instructions for receiving data of a first still image and a second still image, which are taken from different points of view and contain the same object, and generating a composited image by projecting the first still image and the second still image on a projection sphere. The computer-executable program codes further include program code instructions for receiving designation of a specific position in the composited image and selecting one of the first still image and the second still image, which contains the designated specific position.

The present invention solves the problems occurring due to a difference in point of view between cameras in compositing a panoramic image by using multiple images taken by the cameras.

PREFERRED EMBODIMENTS OF THE INVENTION

Outline

Figure 1:
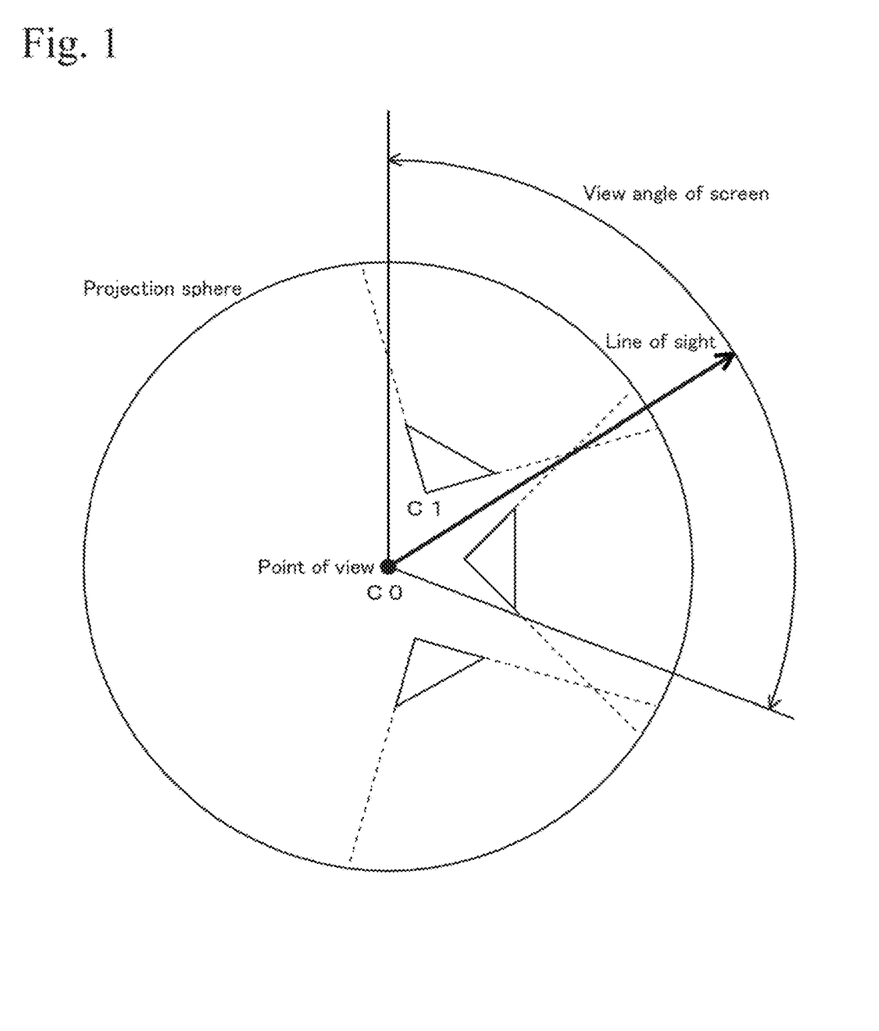
FIG. 1 is an explanatory diagram of a panoramic image.

First, a technical problem will be described. The technical problem can occur compositing multiple images that are taken from different points of view. FIG. 1 shows a principle in generating a panoramic image by projecting three still images on an inner circumferential surface of a projection sphere. The three still images are taken by corresponding cameras from different positions (points of view) so as to partially overlap. Here, still images for compositing a panoramic image are also called single photographic images. The single photographic images are still images that are taken by corresponding cameras, and multiple single photographic images are composited to obtain a panoramic image. For example, FIG. 1 shows a case of using three cameras to respectively take single photographic images and of obtaining a panoramic image by compositing the three single photographic images. The projection sphere is virtually set, and a projected image is generated on the condition that a spherical projection surface substantially exists at the set position.

In the case shown in FIG. 1, the point of view of the panoramic image is positioned at the center of the projection sphere, but the point of view of each of the three images compositing the panoramic image does not coincide with the center of the projection sphere. Thus, when the panoramic image is viewed in detail, distortions in the panoramic image are seen. Moreover, deviations are generated at the stitched portions of the two still images. Such a phenomenon is not likely to become a serious problem in using a panoramic image as an image for understanding an outline of circumstances. However, such a phenomenon is likely to become a problem in using a panoramic image for measurement and for drawing a plan.

In view of this, to solve the above problem, when a specific portion such as a point or an area is designated in a panoramic image, a single photograph containing the designated specific portion is selected from multiple still images compositing the panoramic image, and the display is switched from the panoramic image to the single photographic image. At that time, the point of view is shifted from the point of view of the panoramic image at the center of the projection sphere to the point of view at which the single photographic image is taken. The single photograph does not contain distortions or deviations, which can be generated in compositing a panoramic image as described above, and therefore, an image suitable for use in, for example, measurement, is obtained.

Figure 2:
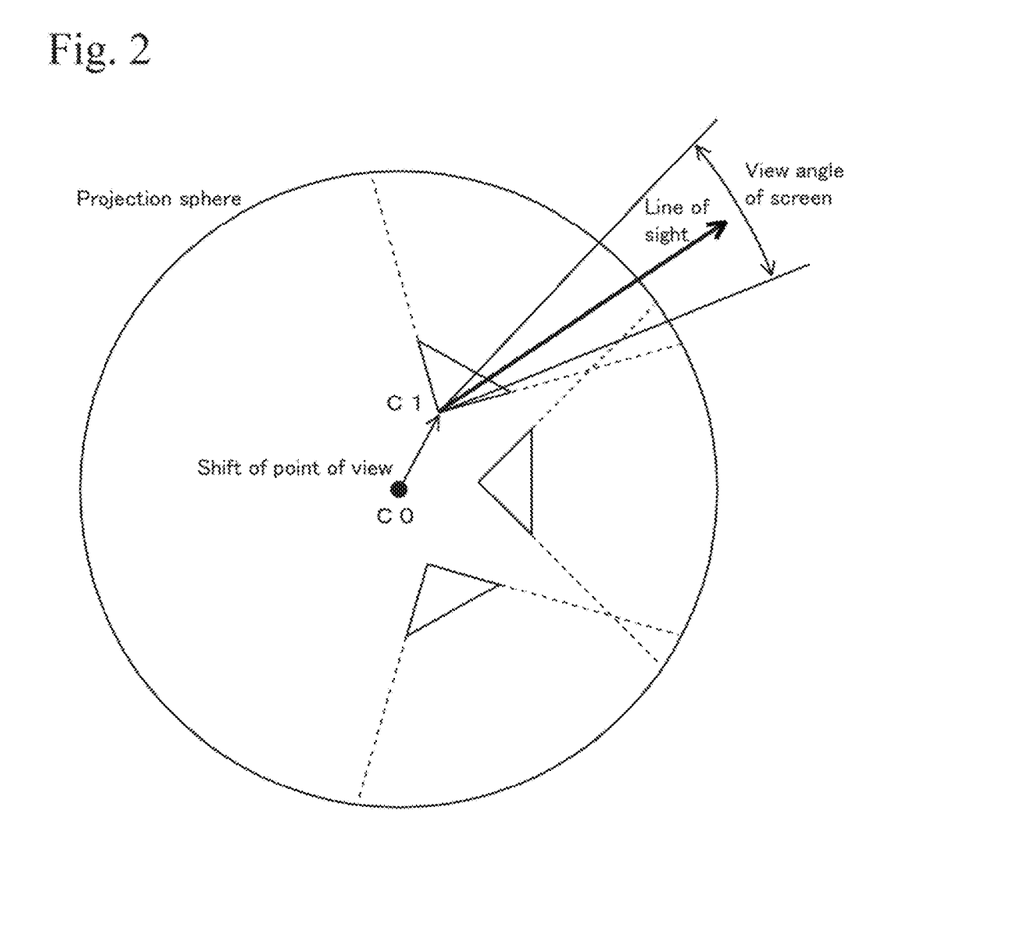
FIG. 2 is an explanatory diagram showing a principle of switching a panoramic image to a single photographic image.

FIG. 2 shows a situation in which the panoramic image shown in FIG. 1 is switched to a single photographic image. In this case, an initial direction of the line of sight shown in FIG. 1 is measured, and a single photographic image that has a direction of a line of sight most similar to the initial direction is selected. FIG. 2 shows a situation in which the point of view is shifted from a point C0 to a point C1 in accordance with the switch of the images, and thus, the panoramic image is switched to the single photographic image.

Structure of Hardware

Figure 3:
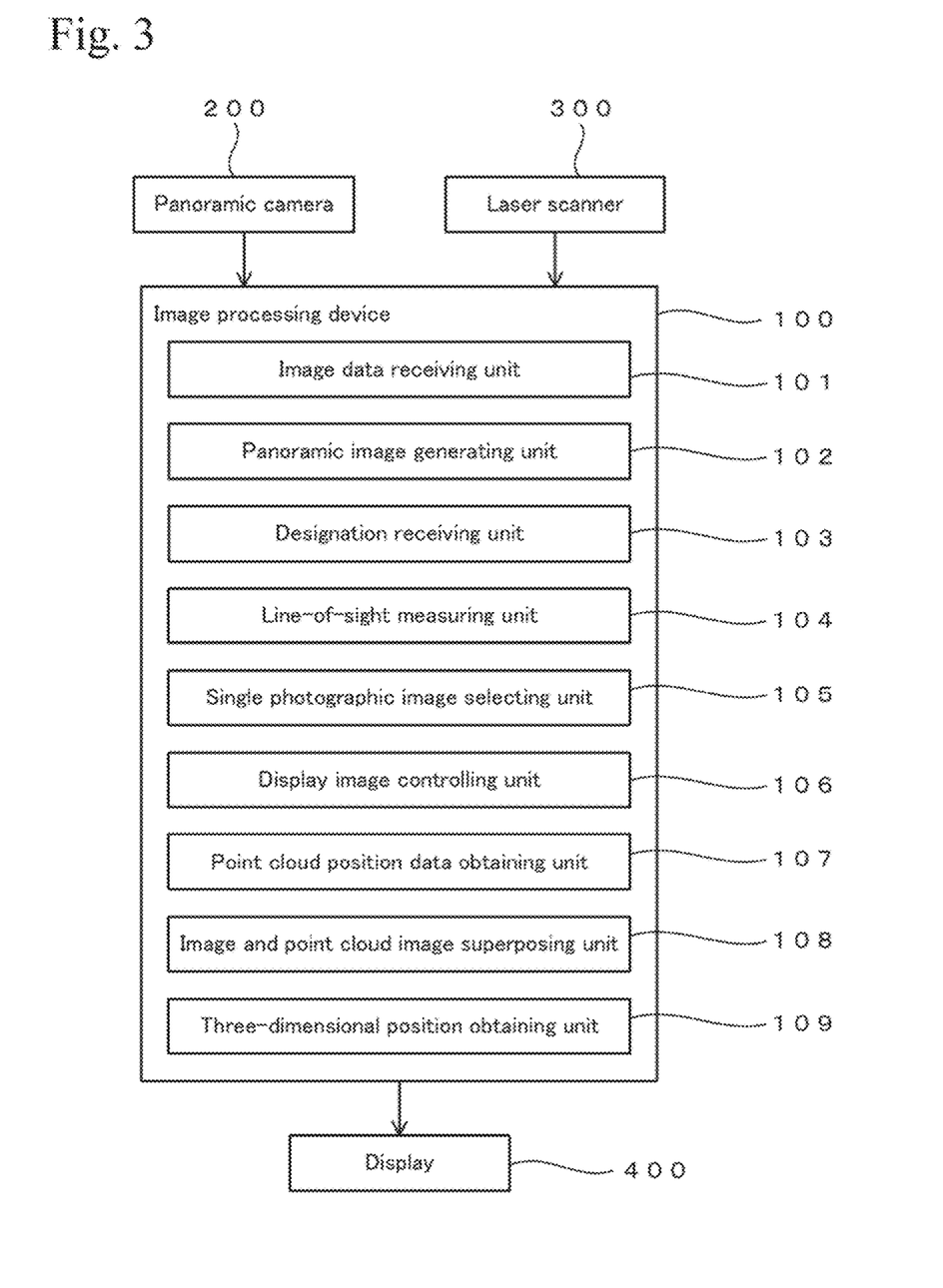
FIG. 3 is a block diagram of an image processing device.

FIG. 3 shows a block diagram of an embodiment and shows an image processing device 100, a panoramic camera 200, a laser scanner 300, and a display 400.

The image processing device 100 functions as a computer and has functional units as described below. The panoramic camera 200 is a multi-eye camera for photographing in every direction and can photograph in an overhead direction and the entirety of the surroundings over 360 degrees. In this embodiment, the panoramic camera 200 is equipped with six cameras. Five of the six cameras are directed a horizontal direction and are arranged at positions at an equal angle of 72 degrees when viewed from a vertical direction. The rest is directed in the vertical upward direction at an elevation angle of 90 degrees. The six cameras are arranged so that their view angles or their photographing areas partially overlap. The still images that are obtained by the six cameras are composited, whereby a panoramic image is obtained.

The relative positional relationships and the relative directional relation between the six cameras of the panoramic camera 200 are preliminarily examined and are therefore already known. Additionally, the positions of the points of view (projection centers) of the six cameras do not coincide with each other due to physical limitations. Details of a panoramic camera are disclosed in Japanese Unexamined Patent Applications Laid-Open Nos. 2012-204982 and 20014-071860, for example. One of commercially available panoramic cameras may be used as the panoramic camera 200, and one example is named "Ladybug 3", produced by Point Grey Research, Inc. Alternatively, a camera that is equipped with a rotary structure may be used for taking multiple still images in different photographing directions instead of the panoramic camera, and these multiple still images may be composited to obtain a panoramic image. Naturally, the panoramic image is not limited to an entire circumferential image and may be an image that contains the surroundings in a specific angle range. The data of the multiple still images, which are taken from different directions by the panoramic camera 200, is transmitted to the image processing device 100.

The six cameras photograph still images at the same time at specific timing. The photographing of the six cameras may be performed at a specific time interval. For example, the six cameras may be sequentially operated at a specific time interval for taking images, and the obtained images are composited to generate an entire circumferential image. Alternatively, a moving image may be taken. In the case of taking a moving image, frame images constituting the moving image, for example, fame images that are taken at a rate of 30 frames per second, are used as still images.

The laser scanner 300 emits laser light on an object and detects light that is reflected at the object, thereby measuring the direction and the distance from the laser scanner 300 to the object. The laser scanner 300 includes a laser emitting unit and a reflected light receiving unit. While moving the laser emitting unit and the reflected light receiving unit in vertical and horizontal directions in the manner of shaking one's head, the lase scanner 300 performs laser scanning in the same area as the photographing area of the panoramic camera 200. Details of a laser scanner are disclosed in Japanese Unexamined Patent Applications Laid-Open Nos. 2008-268004 and 2010-151682, for example.

The positional relationship and the directional relationship between the laser scanner 300 and the panoramic camera 200 are preliminarily obtained and are already known. The laser scanner 300 obtains point cloud position data in a coordinate system such as an absolute coordinate system or a relative coordinate system. The absolute coordinate system is a coordinate system for describing positions that are measured by using a GNSS or the like. The relative coordinate system is a coordinate system for describing a center of a device body of the panoramic camera 200 or another appropriate position as an origin.

The display 400 is an image display device such as a liquid crystal display. The display 400 may include a tablet and a display of a personal computer. The display 400 receives data of the images that are processed by the image processing device 100 and displays the images.

FIG. 3 shows each functional unit equipped on the image processing device 100. The image processing device 100 includes a CPU, various kinds of storage units such as an electronic memory and a hard disk drive, various kinds of arithmetic circuits, and interface circuits. The image processing device 100 functions as a computer that executes functions described below. The image processing device 100 includes an image data receiving unit 101, a panoramic image generating unit 102, a designation receiving unit 103, a line-of-sight measuring unit 104, a single photographic image selecting unit 105, a display image controlling unit 106, a point cloud position data obtaining unit 107, an image and point cloud image superposing unit 108, and a three-dimensional position obtaining unit 109.

These functional units may be constructed of software, for example, they may be constructed so that programs are executed by a CPU, or they may be composed of dedicated arithmetic circuits. In addition, a functional unit that is constructed of software and a functional unit that is composed of a dedicated arithmetic circuit may be used together. For example, each of the functional units shown in FIG. 3 is composed of at least one electronic circuit of a CPU (Central Processing Unit), an ASIC (Application Specific Integrated Circuit), and a PLD (Programmable Logic Device) such as an FPGA (Field Programmable Gate Array).

Whether each of the functional units, which constitute the image processing device 100, is to be constructed of dedicated hardware or to be constructed of software so that programs are executed by a CPU is selected in consideration of necessary operating speed, cost, amount of electric power consumption, and the like. For example, if a specific functional unit is composed of an FPGA, the operating speed is superior, but the production cost is high. On the other hand, if a specific functional unit is configured so that programs are executed by a CPU, the production cost is reduced because hardware resources are conserved. However, when the functional unit is constructed using a CPU, the operating speed of this functional unit is inferior to that of dedicated hardware. Moreover, such a functional unit may not be able to handle complicated operations. Constructing the functional unit by dedicated hardware and constructing the functional unit by software differ from each other as described above, but are equivalent to each other from the point of view of obtaining a specific function.

Hereinafter, each of the functional units that are equipped on the image processing device 100 will be described. The image data receiving unit 101 receives data of the still images that are taken by the panoramic camera 200. Specifically, the image data receiving unit 101 receives data of the still images that are taken by the six cameras equipped on the panoramic camera 200. Each of the still images, which are taken by the six cameras, is used as a single photographic image.

The panoramic image generating unit 102 sets a projection sphere and projects the six still images (single photographic images) on an inner circumferential surface of the projection sphere. The six still images are already received by the image data receiving unit 101. The six still images are composited by being projected on the projection sphere, whereby a panoramic image is obtained. The panoramic image is viewed from the center of the projection sphere. The radius of the projection sphere is set at a predetermined specific value or at infinity. The center of the projection sphere is, for example, set at a position of the structural gravity center of panoramic camera 200 or another convenient position.

The designation receiving unit 103 receives designation of a target point in a composited image (panoramic image) that is generated by the panoramic image generating unit 102. For example, two still images that contain the same object may be composited to generate a panoramic image, and the panoramic image may be displayed on a display of a PC (Personal Computer). In this condition, a user may control a GUI (Graphical User Interface) of the PC and may designate a desired point to be enlarged, as a target point. The data relating to this operation content is received by the designation receiving unit 103.

The line-of-sight measuring unit 104 measures a line of sight from the center of the projection sphere or the point of view of the panoramic image to the target point, which is received by the designation receiving unit 103. In this embodiment, a vector from the center of the projection sphere to the target point is calculated. The relative relationships of exterior orientation parameters between the six cameras, which constitute the panoramic camera 200, are preliminary known, and therefore, the vector from the center of the projection sphere to the designated target point on the inner circumferential surface of the projection sphere is calculated. Specifically, first, coordinates of the target point of the surface of the projection sphere are obtained. Then, a vector that connects the center of the surface of the projection sphere and the obtained coordinate position of the target point is set. The vector is used as a line of sight to the target point in the panoramic image.

The single photographic image selecting unit 105 selects a single photographic image that has a line of sight most similar to an initial line of sight, which is measured by the line-of-sight measuring unit 104. The line of sight of the single photographic image is obtained as a direction perpendicular to the plane of the single photographic image. The line of sight of the single photographic image may also be obtained as a direction from the point of view of the single photographic image to the center of the view angle (center of photographing field of view) of the single photographic image.

The single photographic image selecting unit 105 performs the following processing. First, a direction of view of each of the multiple single photographic images is obtained. Then, the initial direction of view to the target point in the panoramic image and the direction of view to the target point of each of the multiple still images are compared with each other, and the single photographic image that has the direction of view most similar to the initial direction of view is selected. Although the point of view of the panoramic image and the point of view of the single photographic image are different from each other, the difference is small compared with the distance to the target point. Thus, according to the above processing, the single photographic image that contains the target point as rear as possible to the center of the view angle is selected.

The display image controlling unit 106 controls displaying of one both of the panoramic image and the single photographic image on the display 400. In this case, the panoramic image is generated by the panoramic image generating unit 102, and the single photographic image is selected by the single photographic image selecting unit 105. The image is displayed such that one of the panoramic image and the single photographic image that is instructed by a user is displayed, or such that both of the panoramic image and the single photographic image are displayed or divided areas on the screen. The display image controlling unit 106 also controls switching of the single photographic images.

The point cloud position data obtaining unit 107 obtains three-dimensional point cloud position data that is measured by the laser scanner 300. The image and point cloud image superposing unit 108 generates a superposed image of a panoramic image and point clouds by superposing the panoramic imaged the three-dimensional point cloud position data.

The point cloud position data includes the direction of each point that constitutes the point clouds, as viewed from the laser scanner 300. Thus, each point as viewed from the laser scanner 300 is projected on inner circumferential surface of a projection sphere to generate a point cloud image that has the projected points as pixels, which is a two-dimensional image made of point clouds. The point cloud is made of points and can be used in the same way as an ordinary still image.

Figure 4:
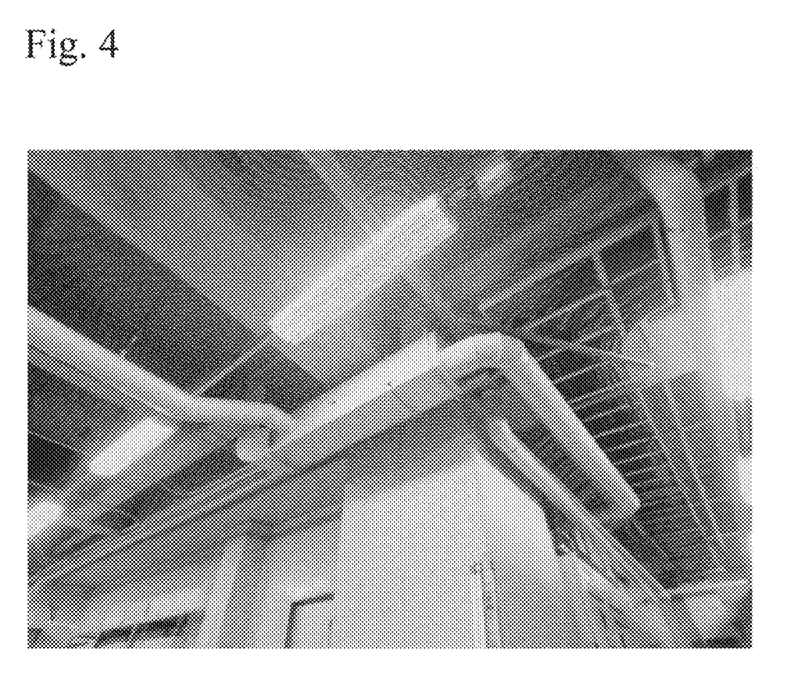
FIG. 4 shows an example of an image in which a panoramic image and point cloud data are superposed.

The relative positional relationship and the relative directional relationship between the panoramic camera 200 and the laser scanner 300 are preliminarily obtained and are already known. Thus, the still images that are taken by the six cameras of the panoramic camera 200 and the point cloud image are superposed in the same manner as the method of compositing the images, which are taken by the six cameras constituting the panoramic camera 200. According to this principle, the panoramic image, which is obtained by compositing the multiple still images that are taken by the panoramic camera 200, and the point cloud image are superposed. The image thus obtained is a superposed image in which the panoramic image obtained from the images taken by the cameras and the point cloud data are superposed. This processing is performed by the image and point cloud image superposing unit 108. An example of a superposed image that is obtained by superposing a panoramic image and a point cloud image is shown in FIG. 4.

The three-dimensional position obtaining unit 109 obtains the three-dimensional position of the target point, which is designated by the designation receiving unit 103, based on the point cloud position data. Specifically, a point of the point cloud on data, which corresponds to the image position of the target point that is designated by the designation receiving unit 103, is obtained from the superposed image of the panoramic image and the point clouds, as exemplified in FIG. 4. Then, the three-dimensional coordinate position of this obtained point is obtained from the point cloud position data that is obtained by the point cloud position data obtaining unit 107. On the other hand, if there is no point that corresponds to the target point, the three-dimensional coordinate values of the target point are obtained by using one of the following three methods. One method is selecting a point in the vicinity of the target point and obtaining the three-dimensional position thereof. Another method is selecting multiple points in the vicinity of the target point and obtaining an average value of the three-dimensional positions thereof. Yet another method is preselecting multiple points in the vicinity of the target point, finally selecting multiple points, of which three-dimensional positions are close to the target point, from the preselected multiple points, and obtaining an average value of the three-dimensional positions of the finally selected points.

Example of Processing

Hereinafter, an example of a processing procedure that is executed by the image processing device 100 shown in FIG. 3 will be described. Programs for executing the processing, which are described below, are stored in a storage region in the image processing device 100 or an appropriate external storage medium and are executed by the image processing device 100.

Figure 5:
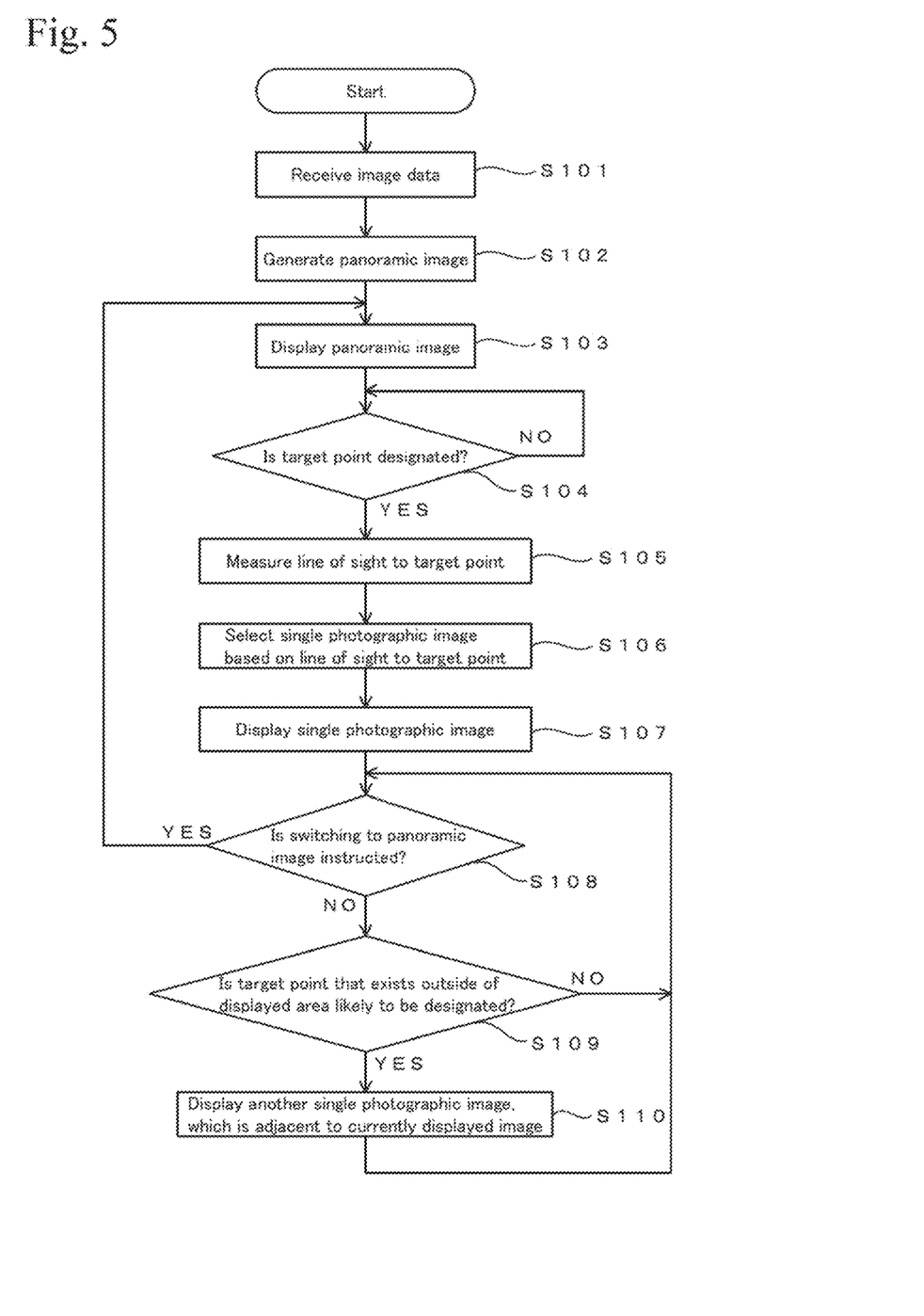
FIG. 5 is a flow chart showing an example of a processing procedure.

FIG. 5 is a flow chart showing an example of a processing procedure. After the processing is started, data of images taken by the panoramic camera 200 is received (step S101). In the processing of this step, data of six single photographic images that are taken by the corresponding six cameras of the panoramic camera 200 is obtained. The processing of this step is performed by the image data receiving unit 101.

Next, a panoramic image is generated by compositing the six single photographic images (step S102). In the processing of this step, a projection sphere is set, and each of the six single photographic images is projected on an inner circumferential surface of the projection sphere, whereby a panoramic image is generated. The processing of this step is performed by the panoramic image generating unit 102. After the panoramic image is generated, the panoramic image data is transmitted to the display 400, and the panoramic image is displayed on the display 400 (step S103).

While the panoramic image is displayed on the display 400, when a user designates a specific point in the panoramic image as a target point, judgement is performed in step S104 and results in "YES", and the processing advances to step S105. If the user designates no target point, the panoramic image displayed in step S103 is continuously shown.

In the processing in step S105, an initial direction of view from the center of the projection sphere to the target point, which is received by the designation receiving unit 103, is measured (step S105). The processing of this step is performed by the line-of-sight measuring unit 104. After the initial direction of view to the target point in the panoramic image is measured, a single photographic image that has a direction of view most similar to the initial direction of view is selected (step S106).

In the processing of this step, the direction from the center of the projection sphere to the target point designated in the panoramic image is identified as a first direction. Then, the direction from the point of view of each of the single photographic images to the image center, that is, the direction perpendicular to the plane of each of the single photographic images is obtained as a second direction. The second direction is obtained from each of the multiple single photographic images, for example, in this embodiment, six single photographic images. Thus, one that has a second direction most similar to the first direction is selected among the multiple single photographic images.

Next, the single photographic image that is selected in step S106 is displayed (step S107). According to the processing of this step, the panoramic image that is displayed in step S103 is switched to the single photographic image that is selected in step S106. Then, whether the user instructs switching to the panoramic image is judged (step S108). If switching to the panoramic image is instructed, the processing in step S103 and the subsequent steps is executed again. Otherwise, the processing advances to step S109.

The user may change the target point and designates other position in the single photographic image that is displayed in step S107, and the designated other position may be proximate to an edge of the displayed screen. In such a case, judgement in step S109 results in "YES", and the display is switched to a single photographic image adjacent to the single photographic image that is currently displayed (step S110). In the processing of this step, first, whether the new target point in the currently displayed single photographic image is positioned in an overlap area of the adjacent single photographic image is judged. The currently displayed single photographic image is represented as a first single photographic image. The adjacent single photographic image is represented as a second single photographic image. Then, when the new target point is positioned in the overlap area, which image has a distance from the image center to the new target point shorter than the other is judged between the first single photographic image and the second single photographic image. If the second single photographic image has the distance from the image center to the new target point shorter than that of the first single photographic image, the judgement in step S109 results in "YES", and then the display is switched to the second single photographic image (step S110). Otherwise, the processing returns to the step before step S108, and the single photographic image that is already displayed in step S107 is continuously shown.

Figure 6:
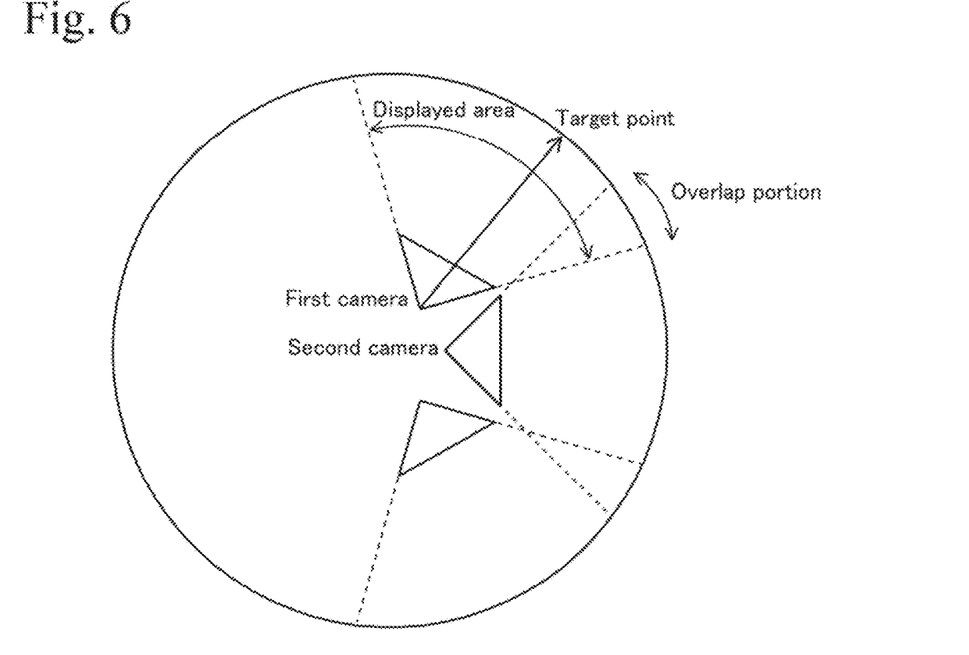
FIG. 6 is an explanatory diagram showing a principle of switching single photographic images.
Figure 7:
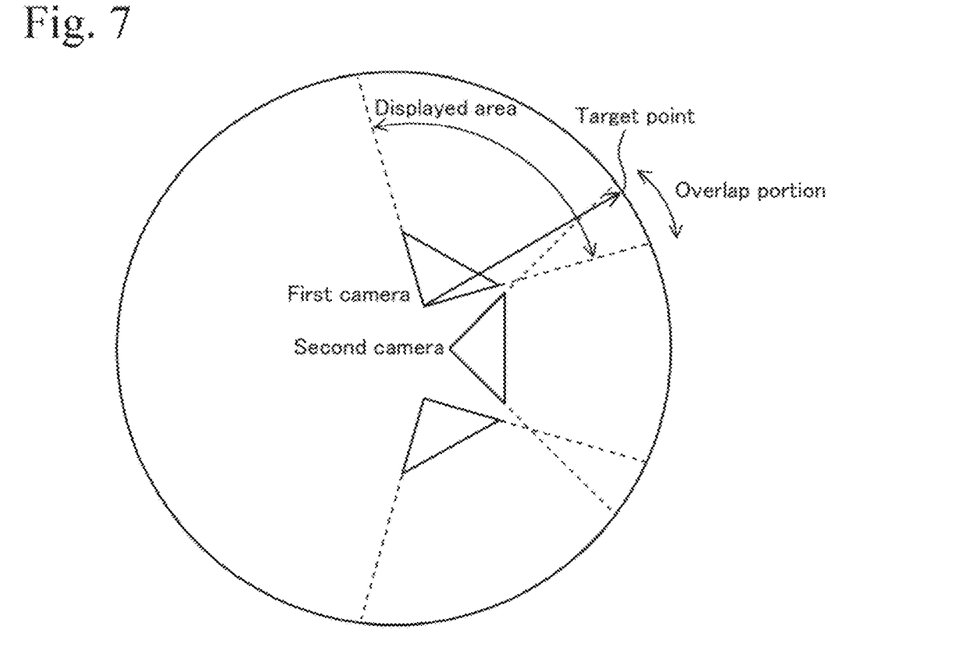
FIG. 7 is an explanatory diagram showing a principle of switching single photographic images.

Hereinafter, an example of the processing from step S109 to step S110 is described with reference to figures. FIG. 6 shows a situation in which a single photographic image that is taken by a first camera is displayed. FIG. 7 shows a situation in which the position of a target point shifts in the clockwise direction in FIG. 6 and comes in an overlap area that is taken by both of the first camera and a second camera.

Figure 8:
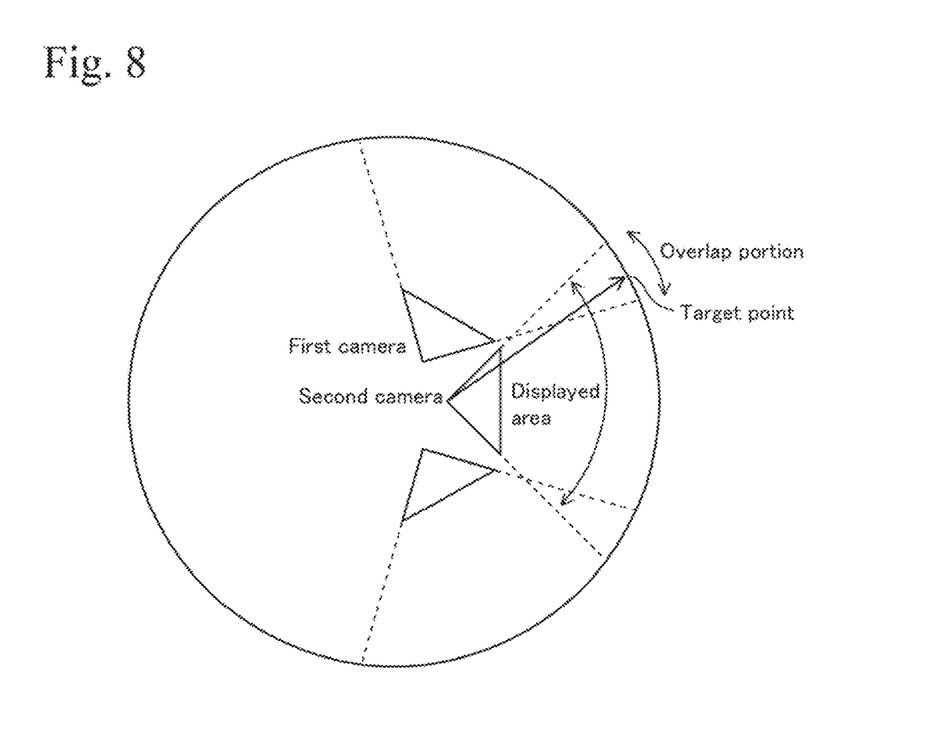
FIG. 8 is an explanatory diagram showing a principle of switching single photographic images.

In the case shown in FIG. 7, the target point is proximate to the center of the photographing area of the first camera, and thus, the single photographic image, which is taken by the first camera, is still displayed. FIG. 8 shows a situation in which the target point further shifts in the clockwise direction from the position shown in FIG. 7. In the case shown in FIG. 8, the target point is proximate to the center of the view angle (photographing area) of the second camera rather than the center of the photographing area of the first camera, and thus, the display is switched to the single photographic image, which is taken by the second camera. Thus, in accordance with the change of the target point, the image that is displayed on the display 400 is switched from the single photographic image, which is taken by the first camera, to the single photographic image, which is taken by the second camera. At that time, the position of the point of view is shifted correspondingly to the switch of the displayed image.

Change of Display Area of Panoramic Image

Figure 9:
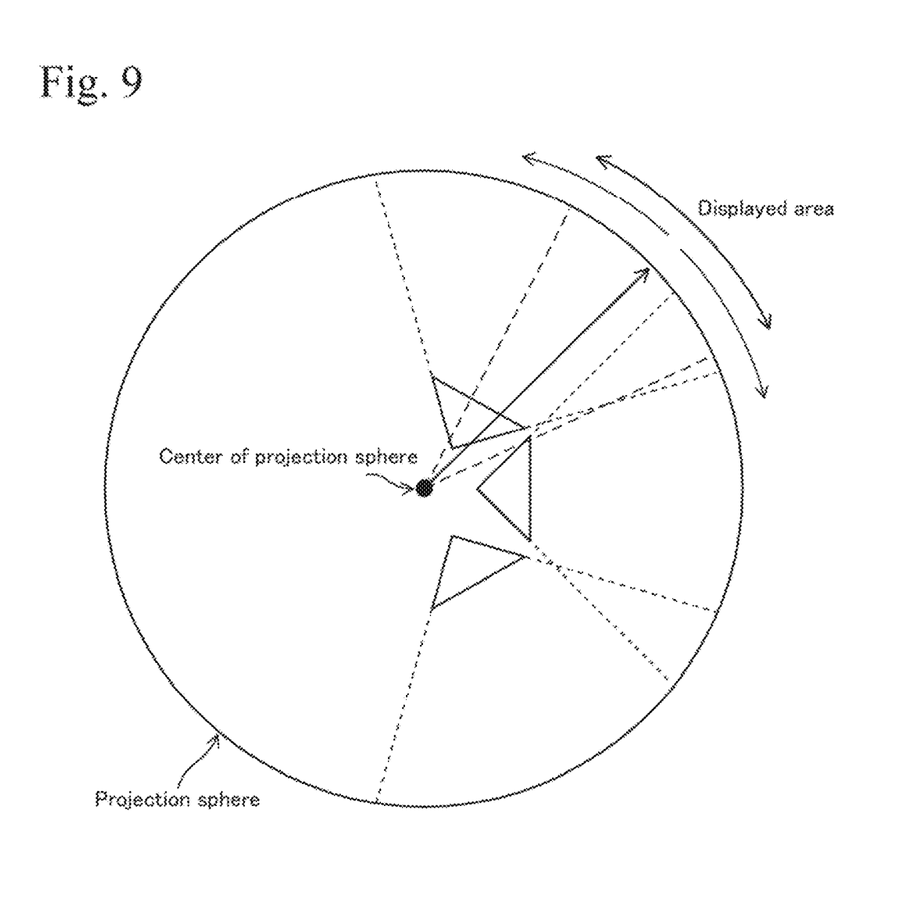
FIG. 9 is an explanatory diagram showing a change of a displayed image by moving a line of sight to a panoramic image.

Displaying the entirety of the panoramic image on the display 400 may not be reasonable, and a part of the panoramic image is usually displayed on the display 400. FIG. 9 shows an example of such a case. In this case, a target point is set at the center of the displayed image. As the displayed area is changed, the target point shifts on the spherical surface. In the example shown in FIG. 9, the area to be displayed is moved within the panoramic image. At that time, the position of the point of view is not shifted.

Examples of Changing Display Magnification

Figure 10A:
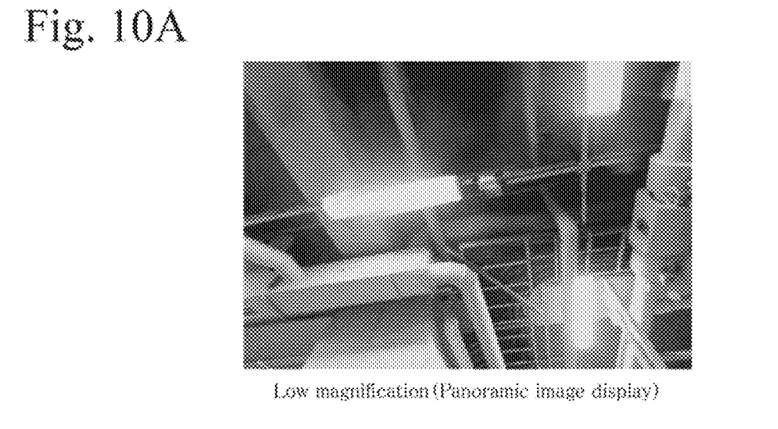
FIGS. 10A to 10C show examples of displayed images of which display magnifications are different from each other.
Figure 10B:
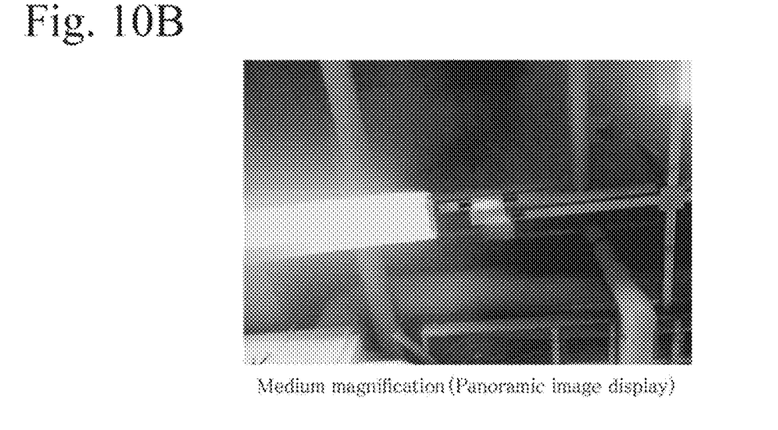
Figure 10C:
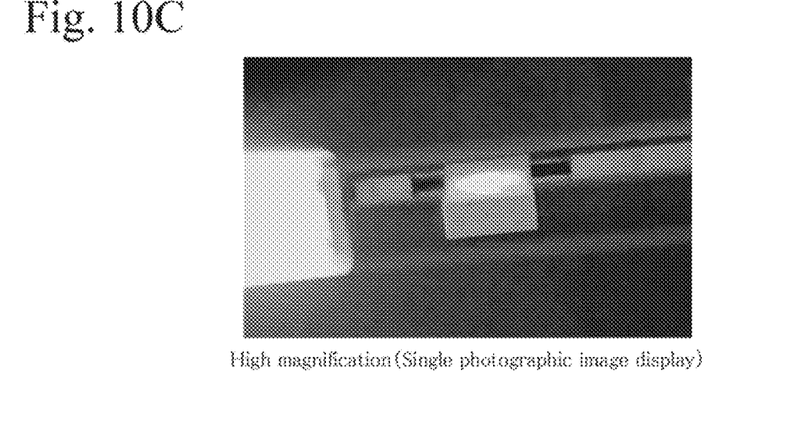

FIG. 10A shows an example of a panoramic image that is displayed at a low magnification. FIG. 10A shows deviations of objects, which are problems in a displayed panoramic image. FIG. 10B shows the panoramic image that is displayed at a medium magnification in the condition shown in FIG. 10A. Also in this case, deviations of the objects, which are problems in the displayed panoramic image, exist. FIG. 10C shows a case in which the vicinity of the center of the panoramic image shown in FIG. 10B is focused on and the display is switched to a single photographic image containing the target point. The single photographic image is enlarged in FIG. 10C. As shown in FIG. 10C, by switching the display from the panoramic image to the single photographic image, the deviations of the objects, which are problems in the panoramic image, do not exist. It should be noted that the entirety of the image shown in FIG. 10C is blurred due to the performance of the camera, and a clear image can be obtained if a high resolution camera is used.

Other Matters

The designation of the target point may be received by another method. For example, the panoramic image may be displayed on a touch panel display, and this display may be touched using a stylus or the like, whereby the designation of the target point is received. In another example, the direction of gaze of a user viewing the panoramic image is detected, and an intersection point of the direction of gaze and the image plane of the panoramic image is calculated. Then, the position of the intersection point is received as a designated position. Details of a technique for detecting a direction of gaze are disclosed in Japanese Unexamined Patent Application Laid-Open No. 2015-118579, for example.

What is claimed is:

1. An image processing device comprising:
an image data receiving unit configured to receive data of a first still image and a second still image, which are taken from different points of view and contain the same object;
a composited image generating unit configured to project the first still image and the second still image on a projection sphere and thereby generate a composited image;
a designation receiving unit configured to receive designation of a specific position in the composited image;
a selecting unit configured to select one of the first still image and the second still image, which contains the designated specific position;
a point cloud position data obtaining unit configured to obtain three-dimensional point cloud position data that is measured by a laser scanner;
an image and point cloud image superposing unit configured to generate a superposed image by superposing the composited image and a point cloud image, the point cloud image being obtained by projecting points of the three-dimensional point cloud position data on the projection sphere; and
a three-dimensional position obtaining unit configured to obtain a three-dimensional position of the specific position that is designated in the composited image, based on the superposed image.

2. The image processing device according to claim 1, wherein the selecting unit selects one of the first still image and the second still image, of which direction is similar to a direction of the specific position as viewed from a center of the projection sphere more than the other image.

3. The image processing device according to claim 1, further comprising:

a display controlling unit configured to control displaying of the first still image or the second still image on a display, the first still image and the second still image have overlap portions, and when one of the first still image and the second still image is displayed, and a specific position in the overlap portion is designated in the displayed still image, which is closer to a center of the other still image than a center of the displayed still image, the display controlling unit displays the other still image.

4. An image processing method comprising:

receiving data of a first still image and a second still image, which are taken from different points of view and contain the same object;

generating a composited image by projecting the first still image and the second still image on a projection sphere;

receiving designation of a specific position in the composited image;

selecting one of the first still image and the second still image, which contains the designated specific position;

obtaining three-dimensional point cloud position data that is measured by a laser scanner;

generating a superposed image by superposing the composited image and a point cloud image, the point cloud image being obtained by projecting points of the three-dimensional point cloud position data on the projection sphere; and obtaining a three-dimensional position of the specific position that is designated in the composited image, based on the superposed image.

5. A computer program product comprising a non-transitory computer-readable medium storing computer-executable program codes for processing images, the computer-executable program codes comprising program code instructions for:

receiving data of a first still image and a second still image, which are taken from different points of view and contain the same object;

generating a composited image by projecting the first still image and the second still image on a projection sphere;

receiving designation of a specific position in the composited image;

selecting one of the first still image and the second still image, which contains the designated specific position;

obtaining three-dimensional point cloud position data that is measured by a laser scanner;

generating a superposed image by superposing the composited image and a point cloud image, the point cloud image being obtained by projecting points of the three-dimensional point cloud position data on the projection sphere; and obtaining a three-dimensional position of the specific position that is designated in the composited image, based on the superposed image.

6. The image processing device according to claim 2, further comprising:

a display controlling unit configured to control displaying of the first still image or the second still image on a display, the first still image and the second still image have overlap portions, and when one of the first still image and the second still image is displayed, and a specific position in the overlap portion is designated in the displayed still image, which is closer to a center of the other still image than a center of the displayed still image, the display controlling unit displays the other still image.

* * * * *